United States Patent
Sayani et al.

(10) Patent No.: US 8,995,435 B2
(45) Date of Patent: *Mar. 31, 2015

(54) PORT PROFILE ANALYTICS

(75) Inventors: Sesh Sayani, San Jose, CA (US); Vineet Banga, San Jose, CA (US); David B. Hamilton, Milpitas, CA (US); Murthy Bhetanabhotla, Sunnyvale, CA (US); Sadasivudu Malladi, San Jose, CA (US); Samir Savla, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/440,861

(22) Filed: Apr. 5, 2012

(65) Prior Publication Data

US 2013/0148654 A1    Jun. 13, 2013

Related U.S. Application Data

(60) Provisional application No. 61/569,189, filed on Dec. 9, 2011.

(51) Int. Cl.
*H04L 12/50*    (2006.01)
*H04L 12/721*   (2013.01)
*H04L 12/931*   (2013.01)

(52) U.S. Cl.
CPC .............. *H04L 45/66* (2013.01); *H04L 49/356* (2013.01); *H04L 49/70* (2013.01)
USPC ........................................................ 370/382

(58) Field of Classification Search
CPC ....................................................... H04L 45/00
See application file for complete search history.

(56) References Cited

U.S. PATENT DOCUMENTS

| | | | |
|---|---|---|---|
| 6,873,602 B1* | 3/2005 | Ambe | 370/254 |
| 7,558,195 B1* | 7/2009 | Kuo et al. | 370/219 |
| 7,787,480 B1* | 8/2010 | Mehta et al. | 370/401 |
| 2003/0174706 A1* | 9/2003 | Shankar et al. | 370/393 |
| 2007/0289017 A1* | 12/2007 | Copeland | 726/23 |
| 2009/0025007 A1* | 1/2009 | Hara et al. | 718/105 |
| 2009/0292858 A1* | 11/2009 | Lambeth et al. | 711/6 |
| 2010/0287262 A1* | 11/2010 | Elzur | 709/220 |
| 2011/0035498 A1* | 2/2011 | Shah et al. | 709/226 |
| 2011/0085563 A1* | 4/2011 | Kotha et al. | 370/401 |
| 2011/0231574 A1* | 9/2011 | Saunderson et al. | 709/245 |
| 2011/0243133 A9* | 10/2011 | Villait et al. | 370/392 |
| 2011/0307715 A1* | 12/2011 | Diab | 713/300 |
| 2012/0011240 A1* | 1/2012 | Hara et al. | 709/223 |
| 2012/0294192 A1* | 11/2012 | Masood et al. | 370/255 |
| 2013/0034015 A1* | 2/2013 | Jaiswal et al. | 370/254 |
| 2013/0067466 A1* | 3/2013 | Combs et al. | 718/1 |

* cited by examiner

*Primary Examiner* — Chirag Shah
*Assistant Examiner* — Jael Ulysse
(74) *Attorney, Agent, or Firm* — Shun Yao; Park, Vaughan, Fleming & Dowler, LLP

(57) ABSTRACT

One embodiment of the present invention provides a computer system. The computer system includes a display mechanism, a storage, and a migration management mechanism. The storage stores a data structure indicating one or more port profiles. The migration management mechanism identifies one or more port profiles associated with a target switch for a migrating virtual machine, wherein the target switch is coupled to a target host machine of the virtual machine and recommends whether the target switch is suitable for the virtual machine by examining an identifier to the virtual machine in the port profiles associated with the target switch using the display mechanism.

18 Claims, 12 Drawing Sheets

| MAC | VLAN | GID |
|---|---|---|
| MAC-1 | X | P-GID-1 |
| MAC-2 | X | P-GID-2 |
| MAC-3 | X | P-GID-1 |
| MAC-4 | X | P-GID-2 |
| MAC-5 | X | P-GID-2 |
| MAC-6 | X | P-GID-2 |

PORT PROFILE ANALYTICS

RELATED APPLICATIONS

This application claims the benefit of U.S. Provisional Application No. 61/569,189, titled "Advanced Management of Port Profiles: Port Profile Analytics," by inventors Vineet Banga, Sesh Sayani, and Sada Malladi, filed 9 Dec. 2011, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 13/042,259, titled "Port Profile Management for Virtual Cluster Switching," by inventors Dilip Chatwani, Suresh Vobbilisetty, and Phanidhar Koganti, filed 7 Mar. 2011, the disclosures of which are incorporated by reference herein.

BACKGROUND

1. Field

The present disclosure relates to network management. More specifically, the present disclosure relates to a method and system for recommending a target switch for a migrating virtual machine.

2. Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking as a practical option in building a large-scale switching system. Furthermore, a system based on stacked switches often has topology limitations which restrict the scalability of the system due to fabric bandwidth considerations.

In addition, the evolution of virtual computing has placed additional requirements on the network. For example, as the locations of virtual servers become more mobile and dynamic, it is often desirable that the network configuration can respond to the changes in a timely fashion. However, at present, there are no readily applicable solutions that can achieve this goal without using proprietary communication protocols.

SUMMARY

One embodiment of the present invention provides a computer system. The computer system includes a display mechanism, a storage, and a migration management mechanism. The storage stores a data structure indicating one or more port profiles. The migration management mechanism identifies one or more port profiles associated with a target switch for a migrating virtual machine, and identifies whether the target switch is recommendable for the virtual machine.

In a variation on this embodiment, the migration management mechanism also identifies the target switch as not recommendable in response to not finding an identifier of the virtual machine in the port profiles associated with the target switch.

In a variation on this embodiment, the migration management mechanism also identifies the target switch as not recommendable in response to finding a mismatch in respective port profiles associated with the target switch and a source switch of the virtual machine, wherein the port profiles include an identifier of the virtual machine.

In a further variation on this embodiment, the migration management mechanism also identifies the mismatch after the virtual machine migration to the target switch.

In a variation on this embodiment, the migration management mechanism also identifies the target switch as not recommendable in response to identifying the target switch as overutilized.

In a variation on this embodiment, the port configuration includes one or more sets of Fibre Channel over Ethernet (FCoE) configuration, VLAN configuration, data center bridging (DCB) configuration, quality of service (QoS) configuration, and security-related configuration.

In a variation on this embodiment, the target switch maintains a membership in a logical switch, wherein the logical switch is configured to accommodate a plurality of switches and operates as a single logical switch.

DETAILED DESCRIPTION

Figure 1:
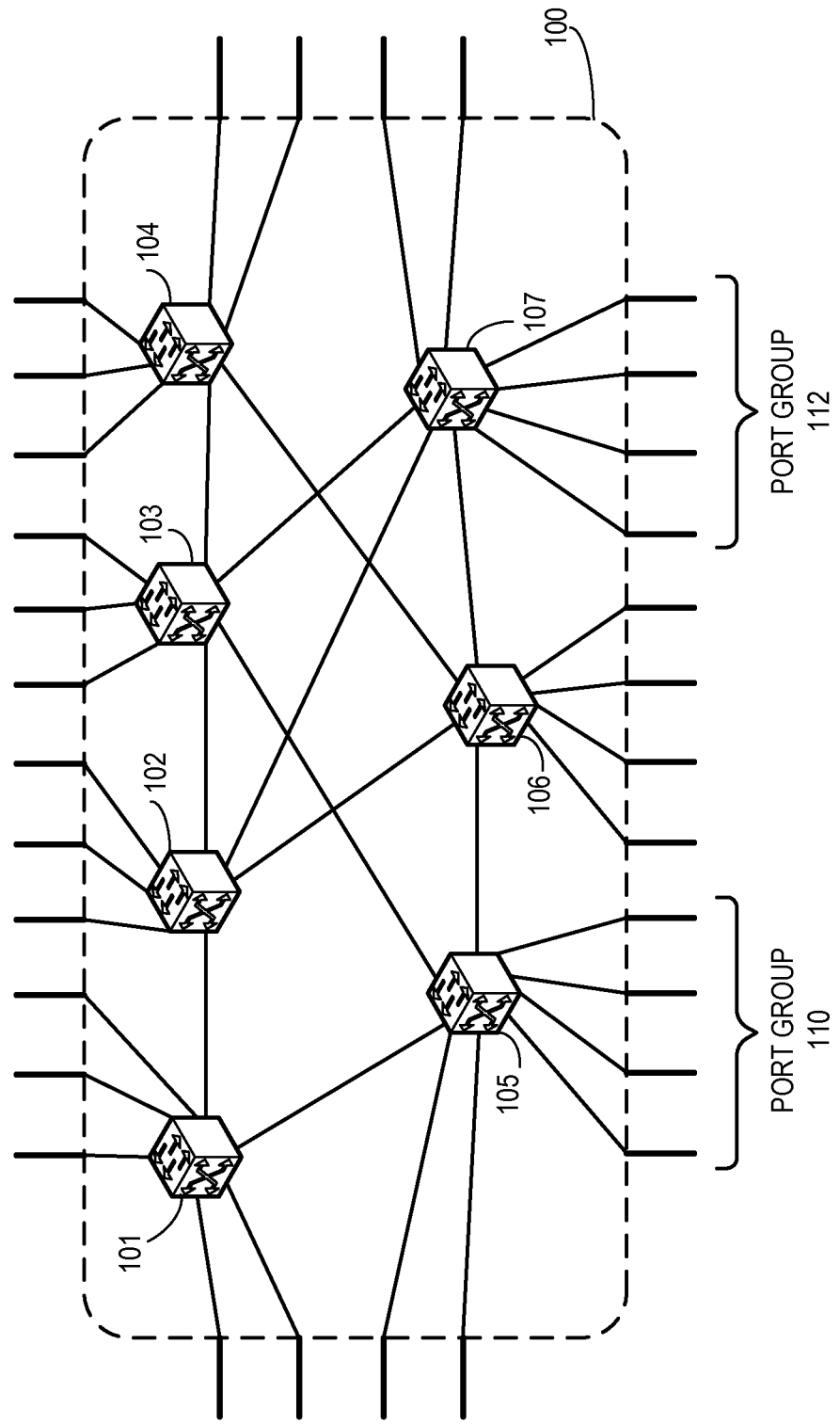
FIG. 1 illustrates an exemplary virtual cluster switch (VCS) system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of identifying a suitable target switch for a migrating virtual machine (VM) is solved by examining the Medium Access Control (MAC) address of the virtual machine and the associated network settings in port profiles on the target switch. These port profile analytics facilitate seamless VM migration. A large-scale logical switch (referred to as a "virtual cluster switch" or VCS herein) is formed using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large cluster switch, which can be viewed as a single logical switch externally. The VCS provides a name service which learns the MAC addresses of devices coupled to any port of any of the member switch, and distributes this MAC address knowledge to every member switch in the VCS. Using this name service, the VCS can quickly detect when a VM moves to a new location from the current location. A port profile corresponding to the VM can then be automatically applied to the new location (i.e., the new physical switch port to which the VM couples). This way, the network can respond quickly to the dynamic location changes, or migrations, of VMs. In this disclosure, the current location (switch) is referred to as a source switch, and the new physical switch is referred to as a target switch. To ensure that the migration works seamlessly, a user (e.g., a system administrator) needs to check whether the profiles are set up correctly on the target switch. For example, the target switch may not have a port profile set up for the VM. Under such a scenario, no port profile can be applied for the migrating VM, and the target switch is not recommended for the VM migration. Furthermore, the target switch may have a port profile set up for the VM, but the network settings in the respective port profiles in the source and the target switches may not match. Consequently, the VM migration may lead to network issues.

To avoid such issues regarding VM migration, embodiments of the present invention facilitate a VM migration management mechanism which provides a recommendation for a target switch using port profile analytics. A user can use this recommendation to ensure a seamless VM migration. The user can check whether the network settings in an associated port profile in a target switch for a migrating VM match the settings in a corresponding port profile in the source switch. A user may also use this feature to diagnose a network disruption due to the VM migration. In this disclosure, the description in conjunction with FIGS. 1-4 is associated with the general architecture of a VCS; the description in conjunction with FIGS. 5-9 provides details on the port profile management mechanisms; and the description in conjunction with FIG. 10 and onward provides more details on the port profile analytics for providing recommendation for a target switch of a migrating VM.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., Internet Protocol (IP) address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a VCS can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the VCS, an individual physical switch can dynamically join or leave the VCS without disrupting services to the rest of the network.

Furthermore, the automatic and dynamic configurability of a VCS allows a network operator to build its switching system in a distributed and "pay-as-you-grow" fashion without sacrificing scalability. The VCS's ability to respond to changing network conditions makes it an ideal solution in a virtual computing environment, where network loads often change with time.

Although this disclosure is presented using examples based on the Transparent Interconnection of Lots of Links (TRILL) as the transport protocol and the Fibre Channel (FC) fabric protocol as the control-plane protocol, embodiments of the present invention are not limited to TRILL networks, or networks defined in a particular Open System Interconnection Reference Model (OSI reference model) layer. For example, a VCS can also be implemented with switches running multi-protocol label switching (MPLS) protocols for the transport. In addition, the terms "RBridge" and "switch" are used interchangeably in this disclosure. The use of the term "RBridge" does not limit embodiments of the present invention to TRILL networks only. The TRILL protocol is described in IETF Request for Comments (RFC) "Routing Bridges (RBridges): Base Protocol Specification," available at http://tools.ietf.org/html/rfc6325, which is incorporated by reference herein.

The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required.

The term "RBridge" refers to routing bridges, which are bridges implementing the TRILL protocol as described in IETF RFC "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

VCS Architecture

FIG. 1A illustrates an exemplary virtual cluster switch system, in accordance with an embodiment of the present invention. In this example, a VCS 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane runs an FC switch fabric protocol stack. The TRILL protocol facilitates transport of Ethernet frames within and across VCS 100 in a routed fashion (since TRILL provides routing functions to Ethernet frames). The FC switch fabric protocol stack facilitates the automatic configuration of individual physical switches, in a way similar to how a conventional FC switch fabric is formed and automatically configured. In one embodiment, VCS 100 can appear externally as an ultra-high-capacity Ethernet switch. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the VCS) and other ports for inter-switch connection. Viewed externally, VCS 100 appears to be one switch to a device from the outside, and any port from any of the physical switches is considered one port on the VCS. For example, port groups 110 and 112 are both VCS external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. VCS 100 is based on a mesh topology. In further embodiments, a VCS can be based on a ring, fat tree, or other types of topologies.

In one embodiment, the protocol architecture of a VCS is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the VCS.

Because of its automatic configuration capability, a VCS can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated with switch complexity. In some embodiments, member switches of a VCS can be connected in a CLOS network. A large-scale switch with a higher port count can be built in a similar way.

Figure 2:
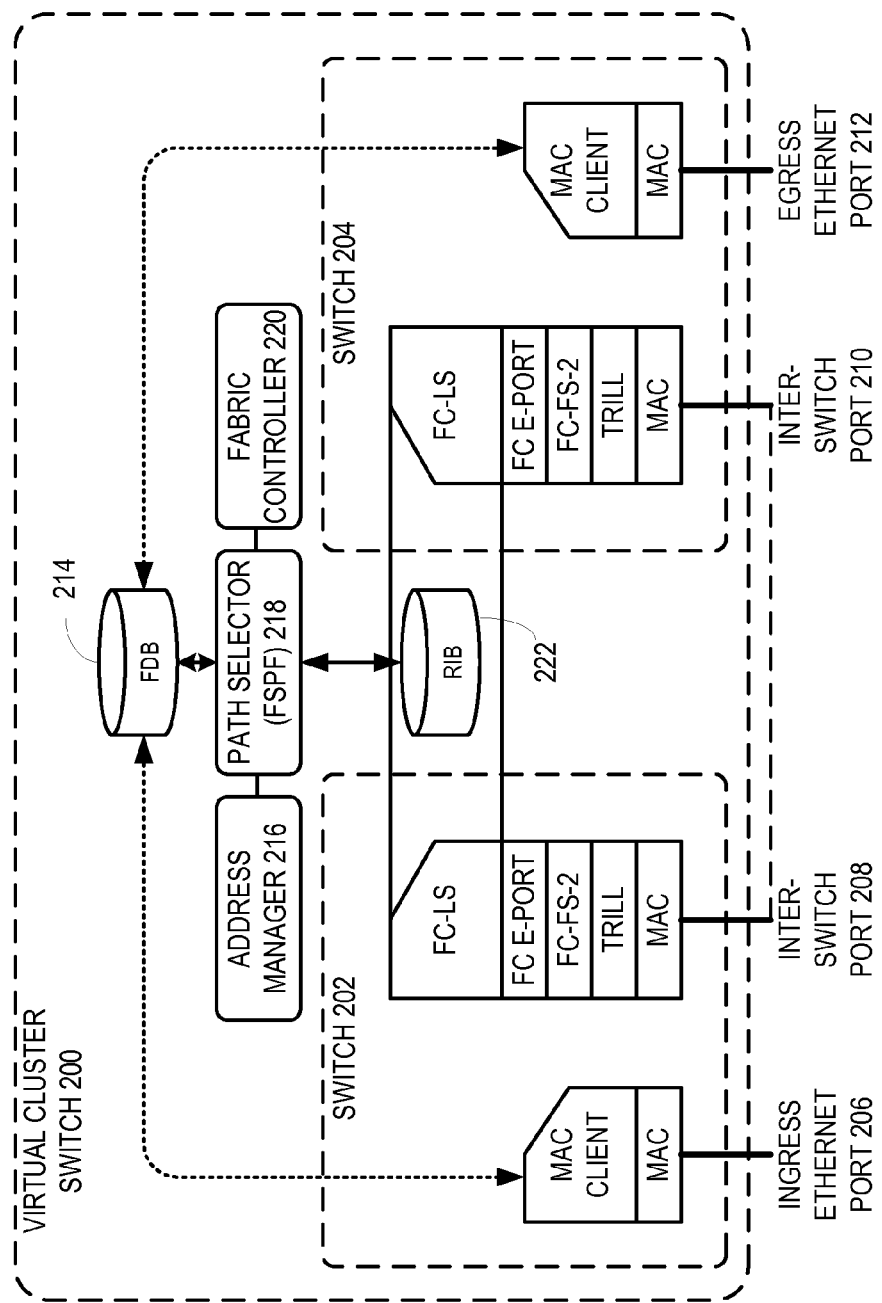
FIG. 2 illustrates the protocol stack within a virtual cluster switch, in accordance with an embodiment of the present invention.

FIG. 2 illustrates the protocol stack within a virtual cluster switch, in accordance with an embodiment of the present invention. In this example, two physical switches 202 and 204 are illustrated within a VCS 200. Switch 202 includes an ingress Ethernet port 206 and an inter-switch port 208. Switch 204 includes an egress Ethernet port 212 and an inter-switch port 210. Ingress Ethernet port 206 receives Ethernet frames from an external device. The Ethernet header is processed by a medium access control (MAC) layer protocol. On top of the MAC layer is a MAC client layer, which hands off the information extracted from the frame's Ethernet header to a forwarding database (FDB) 214. Typically, in a conventional IEEE 802.1Q Ethernet switch, FDB 214 is maintained locally in a switch, which would perform a lookup based on the destination MAC address and the VLAN indicated in the Ethernet frame. The lookup result would provide the corresponding output port. However, since VCS 200 is not one single physical switch, FDB 214 would return the egress switch's identifier (i.e., switch 204's identifier). In one embodiment, FDB 214 is a data structure replicated and distributed among all the physical switches. That is, every physical switch maintains its own copy of FDB 214. When a given physical switch learns the source MAC address and VLAN of an Ethernet frame (similar to what a conventional IEEE 802.1Q Ethernet switch does) as being reachable via the ingress port, the learned MAC and VLAN information, together with the ingress Ethernet port and switch information, is propagated to all the physical switches so every physical switch's copy of FDB 214 can remain synchronized. This prevents forwarding based on stale or incorrect information when there are changes to the connectivity of end stations or edge networks to the VCS.

The forwarding of the Ethernet frame between ingress switch 202 and egress switch 204 is performed via inter-switch ports 208 and 210. The frame transported between the two inter-switch ports is encapsulated in an outer MAC header and a TRILL header, in accordance with the TRILL standard. The protocol stack associated with a given inter-switch port includes the following (from bottom up): MAC layer, TRILL layer, FC-FS-2 layer, FC E-Port layer, and FC link services (FC-LS) layer. The FC-LS layer is responsible for maintaining the connectivity information of a physical switch's neighbor, and populating an FC routing information base (RIB) 222. This operation is similar to what is done in an FC switch fabric. The FC-LS protocol is also responsible for handling joining and departure of a physical switch in VCS 200. The operation of the FC-LS layer is specified in the FC-LS standard, which is available at http://www.t11.org/ftp/t11/member/fc/1s/06-393v5.pdf, the disclosure of which is incorporated herein in its entirety.

During operation, when FDB 214 returns the egress switch 204 corresponding to the destination MAC address of the ingress Ethernet frame, the destination egress switch's identifier is passed to a path selector 218. Path selector 218 performs a fabric shortest-path first (FSPF)-based route lookup in conjunction with RIB 222, and identifies the next-hop switch within VCS 200. In other words, the routing is performed by the FC portion of the protocol stack, similarly to what is done in an FC switch fabric.

Also included in each physical switch are an address manager 216 and a fabric controller 220. Address manager 216 is responsible for configuring the address of a physical switch when the switch first joins the VCS. For example, when switch 202 first joins VCS 200, address manager 216 can negotiate a new FC switch domain ID, which is subsequently used to identify the switch within VCS 200. Fabric controller 220 is responsible for managing and configuring the logical FC switch fabric formed on the control plane of VCS 200.

One way to understand the protocol architecture of VCS is to view the VCS as an FC switch fabric with an Ethernet/TRILL transport. Each physical switch, from an external point of view, appears to be a TRILL RBridge. However, the switch's control plane implements the FC switch fabric software. In other words, embodiments of the present invention facilitate the construction of an "Ethernet switch fabric" running on FC control software. This unique combination provides the VCS with automatic configuration capability and allows it to provide the ubiquitous Ethernet services in a very scalable fashion.

Figure 3:
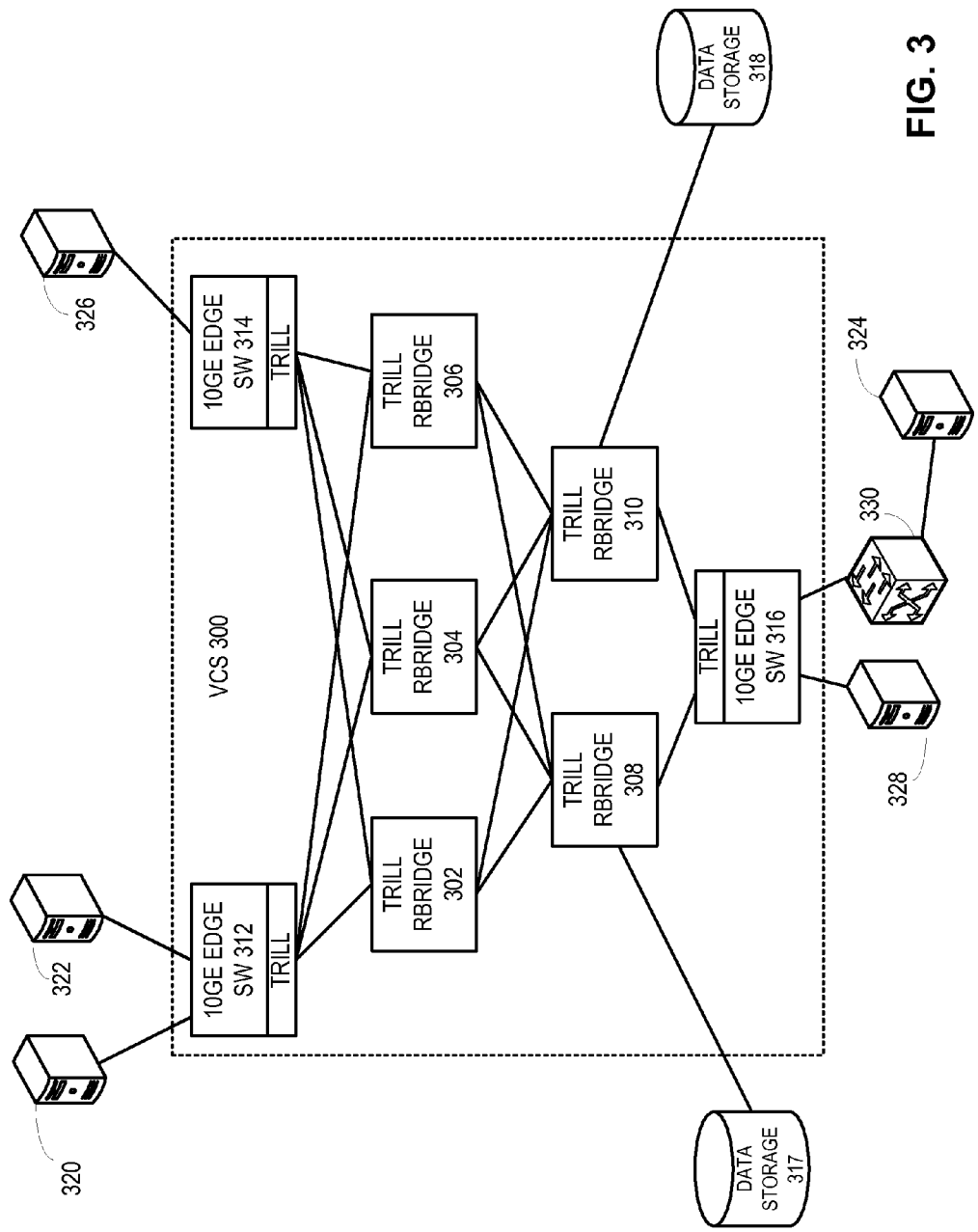
FIG. 3 illustrates an exemplary configuration of how a virtual cluster switch can be connected to different edge networks, in accordance with an embodiment of the present invention.

FIG. 3 illustrates an exemplary configuration of how a virtual cluster switch can be connected to different edge networks, in accordance with an embodiment of the present invention. In this example, a VCS 300 includes a number of TRILL RBridges 302, 304, 306, 308, and 310, which are controlled by the FC switch-fabric control plane. Also included in VCS 300 are RBridges 312, 314, and 316. Each RBridge has a number of edge ports which can be connected to external edge networks.

For example, RBridge 312 is coupled with hosts 320 and 322 via 10GE ports. RBridge 314 is coupled to a host 326 via a 10GE port. These RBridges have TRILL-based inter-switch ports for connection with other TRILL RBridges in VCS 300. Similarly, RBridge 316 is coupled to host 328 and an external Ethernet switch 330, which is coupled to an external network that includes a host 324. In addition, network equipment can also be coupled directly to any of the physical switches in VCS 300. As illustrated here, TRILL RBridge 308 is coupled to a data storage 317, and TRILL RBridge 310 is coupled to a data storage 318.

Although the physical switches within VCS 300 are labeled as "TRILL RBridges," they are different from the conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins VCS 300 (which is logically similar to an FC switch fabric).

Note that TRILL is only used as a transport between the switches within VCS 300. This is because TRILL can readily accommodate native Ethernet frames. Also, the TRILL standards provide a ready-to-use forwarding mechanism that can be used in any routed network with arbitrary topology (although the actual routing in VCS is done by the FC switch fabric protocols). Embodiments of the present invention should be not limited to using only TRILL as the transport. Other protocols (such as multi-protocol label switching (MPLS) or IP), either public or proprietary, can also be used for the transport.

VCS Formation

In one embodiment, a VCS is created by instantiating a logical FC switch in the control plane of each switch. After the logical FC switch is created, a virtual generic port (denoted as G_Port) is created for each Ethernet port on the RBridge. A G_Port assumes the normal G_Port behavior from the FC switch perspective. However, in this case, since the physical links are based on Ethernet, the specific transition from a G_Port to either an FC F_Port or E_Port is determined by the underlying link and physical layer protocols. For example, if the physical Ethernet port is connected to an external device which lacks VCS capabilities, the corresponding G_Port will be turned into an F_Port. On the other hand, if the physical Ethernet port is connected to a switch with VCS capabilities and it is confirmed that the switch on the other side is part of a VCS, then the G_Port will be turned into an E_port.

Figure 4A:
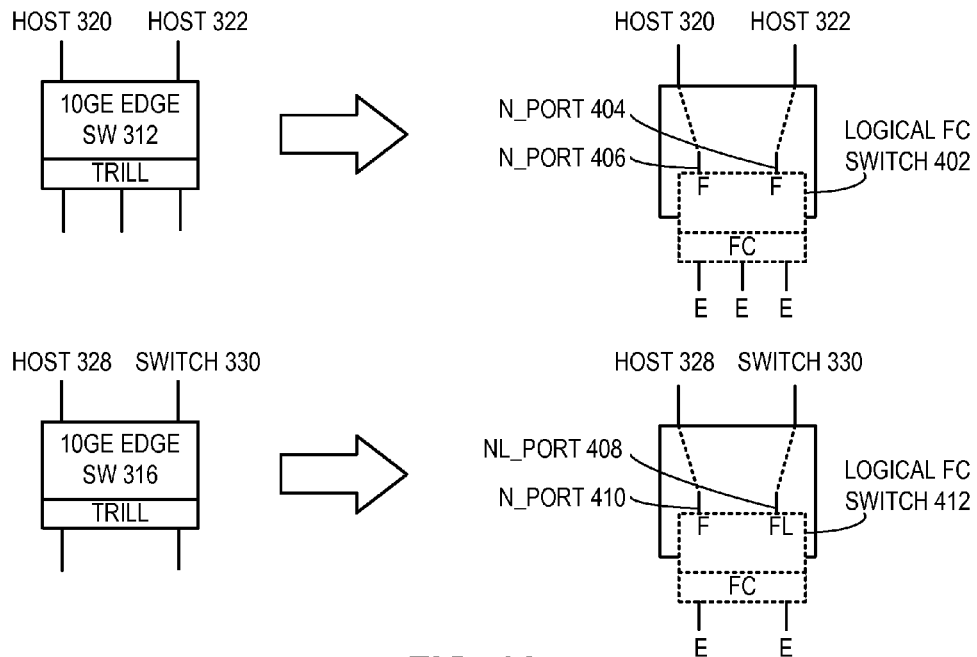
FIG. 4A illustrates how a logical Fibre Channel switch fabric is formed in a virtual cluster switch in conjunction with the example in FIG. 3, in accordance with an embodiment of the present invention.

FIG. 4A illustrates how a logical Fibre Channel switch fabric is formed in a virtual cluster switch in conjunction with the example in FIG. 3, in accordance with an embodiment of the present invention. RBridge 312 contains a virtual, logical FC switch 402. Corresponding to the physical Ethernet ports coupled to hosts 320 and 322, logical FC switch 402 has two logical F_Ports, which are logically coupled to hosts 320 and 322. In addition, two logical N_Ports, 406 and 404, are created for hosts 320 and 322, respectively. On the VCS side, logical FC switch 402 has three logical E_Ports, which are to be coupled with other logical FC switches in the logical FC switch fabric in the VCS.

Similarly, RBridge 316 contains a virtual, logical FC switch 412. Corresponding to the physical Ethernet ports coupled to host 328 and external switch 330, logical FC switch 412 has a logical F_Port coupled to host 328, and a logical FL_Port coupled to switch 330. In addition, a logical N_Port 410 is created for host 328, and a logical NL_Port 408 is created for switch 330. Note that the logical FL_Port is created because that port is coupled to a switch (switch 330), instead of a regular host, and therefore logical FC switch 412 assumes an arbitrated loop topology leading to switch 330. Logical NL_Port 408 is created based on the same reasoning to represent a corresponding NL_Port on switch 330. On the VCS side, logical FC switch 412 has two logical E_Ports, which are to be coupled with other logical FC switches in the logical FC switch fabric in the VCS.

Figure 4B:
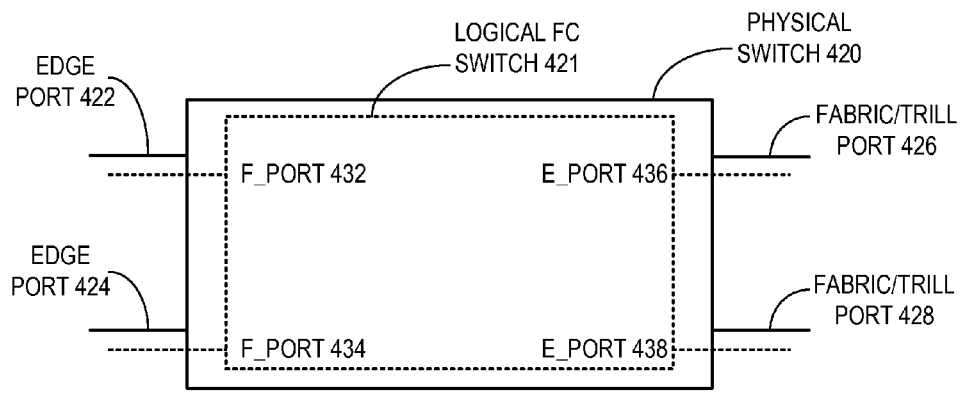
FIG. 4B illustrates an example of how a logical FC switch can be created within a physical Ethernet switch, in accordance with one embodiment of the present invention.

FIG. 4B illustrates an example of how a logical FC switch can be created within a physical Ethernet switch, in accordance with one embodiment of the present invention. The term "fabric port" refers to a port used to couple multiple switches in a VCS. The clustering protocols control the forwarding between fabric ports. The term "edge port" refers to a port that is not currently coupled to another switch unit in the VCS. Standard IEEE 802.1Q and layer-3 protocols control forwarding on edge ports.

In the example illustrated in FIG. 4B, a logical FC switch 421 is created within a physical switch (RBridge) 420. Logical FC switch 421 participates in the FC switch fabric protocol via logical inter-switch links (ISLs) to other switch units and has an FC switch domain ID assigned to it just as a physical FC switch does. In other words, the domain allocation, principal switch selection, and conflict resolution work just as they would on a physical FC ISL.

The physical edge ports 422 and 424 are mapped to logical F_Ports 432 and 434, respectively. In addition, physical fabric ports 426 and 428 are mapped to logical E_Ports 436 and 438, respectively. Initially, when logical FC switch 421 is created (for example, during the boot-up sequence), logical FC switch 421 only has four G_Ports which correspond to the four physical ports. These G_Ports are subsequently mapped to F_Ports or E_Ports, depending on the devices coupled to the physical ports.

Neighbor discovery is the first step in VCS formation between two VCS-capable switches. It is assumed that the verification of VCS capability can be carried out by a handshake process between two neighbor switches when the link is first brought up.

In general, a VCS presents itself as one unified switch composed of multiple member switches. Hence, the creation and configuration of VCS is of critical importance. The VCS configuration is based on a distributed database, which is replicated and distributed over all switches.

In one embodiment, a VCS configuration database includes a global configuration table (GT) of the VCS and a list of switch description tables (STs), each of which describes a VCS member switch. In its simplest form, a member switch can have a VCS configuration database that includes a global table and one switch description table, e.g., [<GT><ST>]. A VCS with multiple switches will have a configuration database that has a single global table and multiple switch description tables, e.g., [<GT><ST0><ST1> . . . <STn-1>]. The number n corresponds to the number of member switches in the VCS. In one embodiment, the GT can include at least the following information: the VCS ID, the number of nodes in the VCS, a list of VLANs supported by the VCS, a list of all the switches (e.g., list of FC switch domain IDs for all active switches) in the VCS, and the FC switch domain ID of the principal switch (as in a logical FC switch fabric). A switch description table can include at least the following information: the IN_VCS flag, an indication whether the switch is a principal switch in the logical FC switch fabric, the FC switch domain ID for the switch, the FC world-wide name (WWN) for the corresponding logical FC switch; the mapped ID of the switch, and optionally the IP address of the switch.

In addition, each switch's global configuration database is associated with a transaction ID. The transaction ID specifies the latest transaction (e.g., update or change) incurred to the global configuration database. The transaction IDs of the global configuration databases in two switches can be compared to determine which database has the most current information (i.e., the database with the more current transaction ID is more up-to-date). In one embodiment, the transaction ID is the switch's serial number plus a sequential transaction number. This configuration can unambiguously resolve which switch has the latest configuration.

Automatic Port Profile Management

Today's server virtualization infrastructure (e.g., a hypervisor, also called virtual machine monitor) associates a server side (e.g., hypervisor or adapter) Virtual Ethernet Bridge (VEB) port profile to each Ethernet MAC address used by a virtual machine (VM) to access the network through a VEB port. Examples of the VEB's port profile attributes includes: the types of frames allowed on the port (e.g., all frames, only frames tagged with certain VLAN values, or untagged frames), the VLAN identifiers that are allowed to be used, and rate limiting attributes (e.g., port or access-control based rate limits). In today's server virtualization infrastructure, if the VM migrates from one physical server to another, the VEB's port profile migrates with it. In other words, today's server virtualization infrastructure provides automated port profile migration of the server's VEB port(s) that are associated with a VM.

However, in existing technologies, there remains a gap between the access and Quality of Service (QoS) controls supported in external layer-2 switches and server virtualization infrastructure. That is, external layer-2 switches have more advanced controls compared to server VEB implementations. Although server virtualization infrastructure is continually adding these controls, this gap is expected to remain. Some environments prefer the more advanced controls provided by external network switches. An example of such an environment is a multi-tier data center that has several types of applications, each with differing advanced network controls, running over the same layer-2 network. In this type of environment the network administrator often prefers the use of advanced access controls available in external switches.

Today's layer-2 networks do not provide a mechanism for automatically migrating switch access and traffic controls associated with an end-point device (e.g., a VM), when that device migrates from one switch to another. The migration may be physical, such as an operating system image (application, middleware, operating system and associated state) that is running on one physical system and is migrated to another system. The migration may be also be virtual, such as an operating system image (OS image) that is running over a hypervisor on one system and is migrated to run over a hypervisor on another system.

Embodiments of the present invention provides a mechanism for automatically migrating port profiles resident in a switch and associated with an OS image to a port on a second switch, when that OS image migrates from one physical end-host system to another end-host system, which is attached to the second switch.

Figure 5:
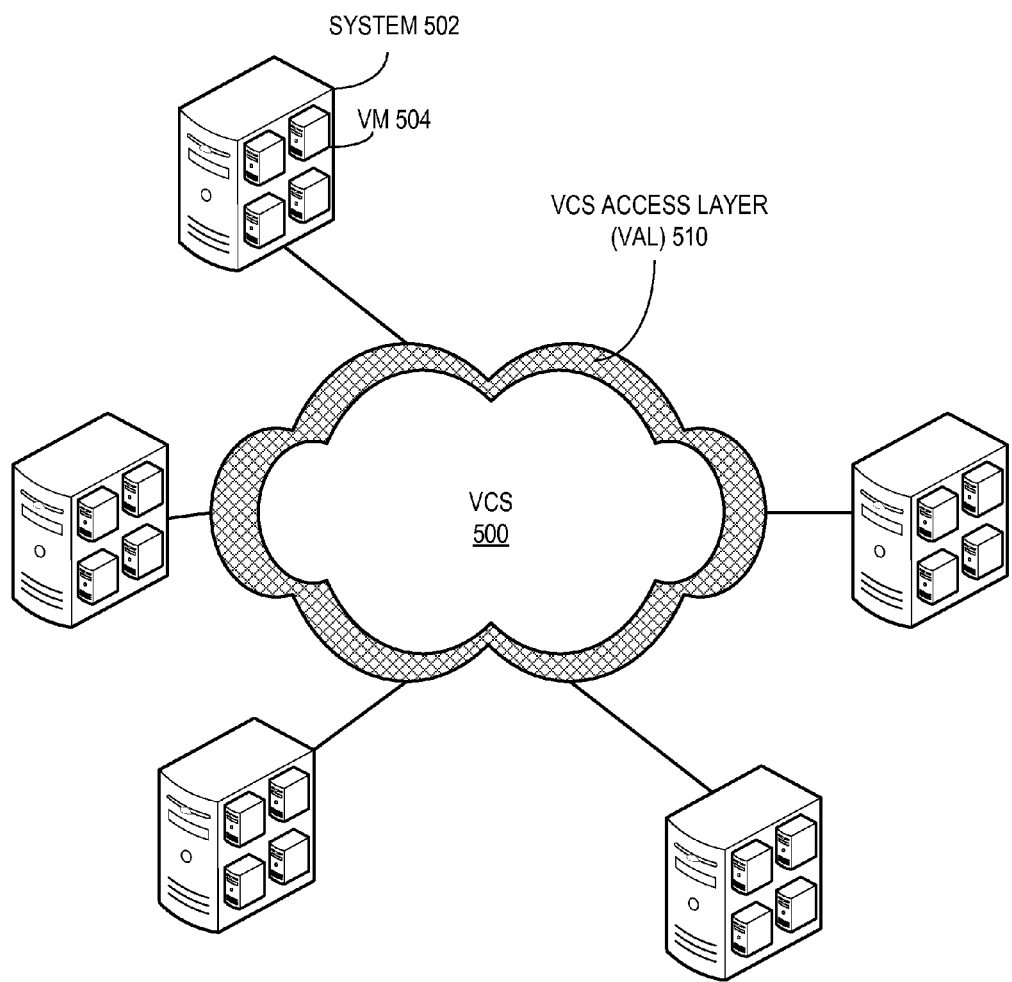
FIG. 5 illustrates a logical VCS access layer (VAL) which includes an automatic port profile manager, in accordance with one embodiment of the present invention.

FIG. 5 illustrates a logical VCS access layer (VAL) which includes an automatic port profile manager, in accordance with one embodiment of the present invention. In this example, a VCS 500 is coupled with a number of physical server systems, such as system 502. Each physical server system runs a number of virtual machines (VMs, also called virtual servers). For example, system 502 includes four VMs, one of which is VM 504. A VM may be dedicated to a certain application (e.g., instant messaging services, directory services, database applications, etc.) and may have its own requirements on the network. A VM running mission-critical applications may require a separate VLAN within VCS 500 and may have more strict QoS requirements (such as guaranteed port bandwidth, low latency, and guaranteed packet delivery). A VM running non-critical applications may have much lower requirements.

The switches within VCS 500 which are coupled externally to the physical end-host systems form a logical VCS access layer (VAL) 510. The automatic migration of port profiles (AMPP) is implemented in VAL 510. During operation, various port profiles, which are often tailored to different requirements of the VMs, are created and distributed to all the member switches in VCS 500. As described in detail below, when the packets generated by a VM are detected by an ingress member switch of VCS 500, the VM's source MAC address is recognized and used to identify the corresponding port profile, which is then applied to the appropriate ingress switch port. When a VM moves from one physical server to another, the MAC-address detection mechanism can quickly identify the new physical switch port to which the VM is coupled, and apply the same port profile to the new port.

Figure 6:
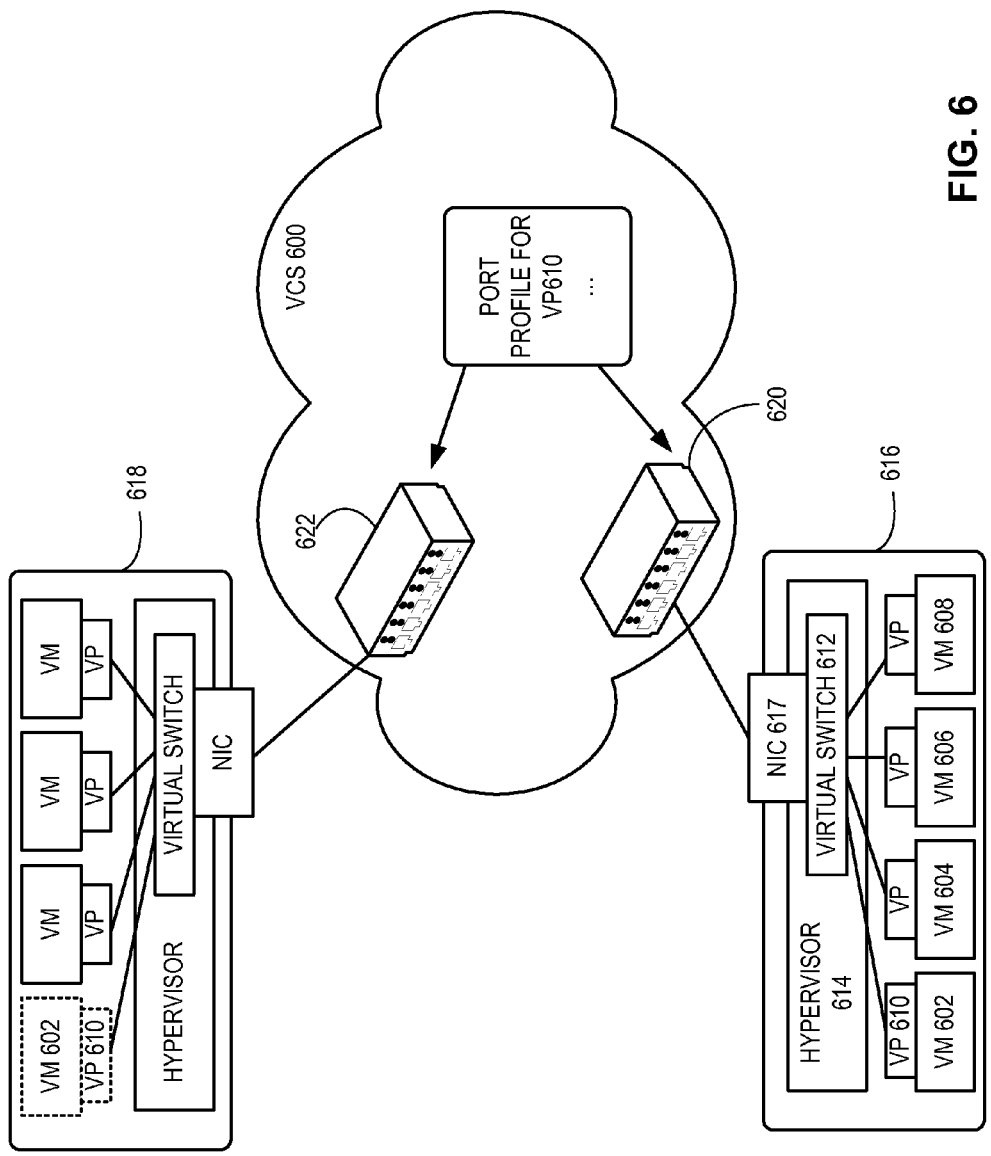
FIG. 6 illustrates an example of the operation of automatic migration of port profiles (AMPP), in accordance with one embodiment of the present invention

FIG. 6 illustrates an example of the operation of AMPP, in accordance with one embodiment of the present invention. In this example, a VCS 600 includes two switches 620 and 622, which are coupled to two physical servers, 616 and 618, respectively. Physical server 616 hosts four VMs, 602, 604, 606, and 608. Each VM has a virtual port (VP, or virtual network interface card, VNIC). For example, VM 602 has a VP 610. A respective VP is assigned a virtual MAC address. The four VPs are logically coupled to a virtual switch 612 which is provided by a hypervisor 614. Virtual switch 612 is responsible for dispatching outgoing and incoming traffic through a physical NIC 617. Note that an Ethernet frame generated by a respective VM has the virtual MAC of the corresponding VP as its source address. Logically, virtual switch 612 functions as an aggregation point that provides a link to the ingress member switch in VCS 600. Physical server 618 has a similar architecture. During operation, a VM can migrate from one physical server to another (e.g., "VMotion" function provided by VMware). This migration can be event-driven or pre-scheduled. Such migration is often used to cope with changing dynamics in a number of parameters, such as server load, power consumption, resource utilization, etc.

During operation, one or more port profiles can be created to specify a number of requirements/restrictions/limitations that should be enforced at a VCS switch port corresponding to one or more VMs. For example, a port profile for VM 602 (which can be identified by the virtual MAC address of VP 610) can be created and distributed to every member switch of VCS 600. When VM 602 sends its first Ethernet frame to the network, switch 620 would learn this source MAC address. Upon learning VP 610's MAC address, switch 620 then searches its port profile database and identifies the matching port profile. Subsequently, the identified port profile is applied to the port on switch 620 which is coupled to system 616. In addition, the same port profile is applied to the port where the matching MAC address is the destination MAC address of a frame. This way, the same network parameters are enforced at both ingress and egress ports of the VCS. Note that the port profile might include "soft" parameters. In other words, the requirements and limitations in the port profile may be specific to certain MAC addresses, and may not be "hard" limitations on the physical parameters of the switch port, since traffic from/to multiple VMs is handled by the same physical switch port.

In one embodiment, VCS 600 provides a mechanism that distributes all the port profiles and the port-profile-to-MAC mapping information to all the member switches. The port profiles can be created using a command line interface (CLI) or other network management software. In addition, upon migration of a VM (such as a VMware VMotion), the target switch port in the VCS can automatically activate the correct port profile configuration.

Figure 7A:
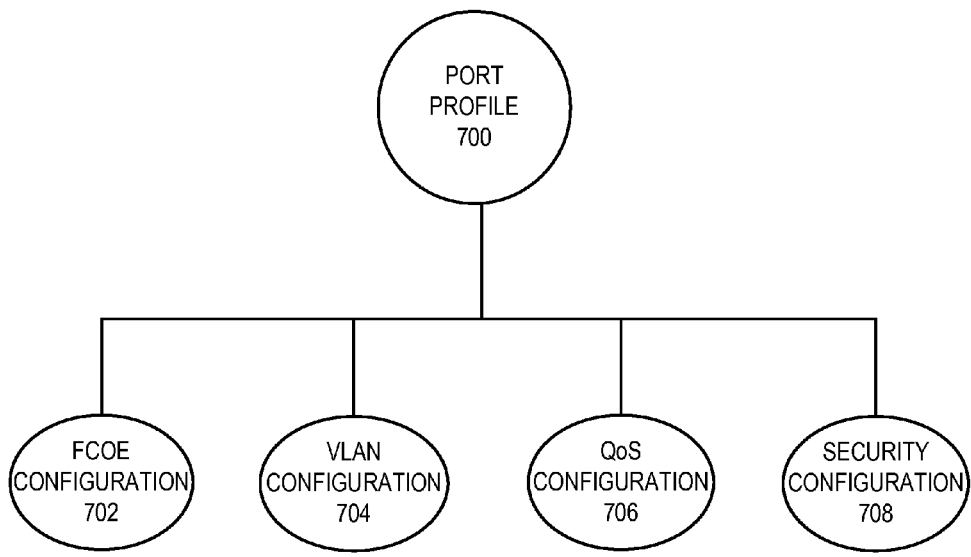
FIG. 7A illustrates exemplary port profile contents, in accordance with one embodiment of the present invention.

FIG. 7A illustrates exemplary port profile contents, in accordance with one embodiment of the present invention. As shown in FIG. 7A, a port profile can contain the entire configuration needed for a VM to gain access to a LAN or WAN, which can include: Fibre Channel over Ethernet (FCoE) configuration 702 (also known as data center bridging (DCB) configuration), VLAN configuration 704, QoS related configuration 706, and security-related configuration 708 (such as access control lists, ACLs). The list above is by no means complete or exhaustive. Furthermore, it is not necessary that a port profile contain every type of configuration information.

In one embodiment, a port profile can be capable of operating as a self-contained configuration container. In other words, if a port profile is applied to a new switch without any additional configuration, the port profile should be sufficient to set the switch's global and local (interface level) configuration and allow the switch to start carrying traffic.

A VLAN configuration profile within a port profile can define:
 a VLAN membership which includes tagged VLANs and an untagged VLAN; and
 ingress/egress VLAN filtering rules based on the VLAN membership.

A QoS configuration profile within a port profile can define:
 mapping from an incoming frame's 802.1p priority to internal queue priority (if the port is in QoS untrusted mode, all incoming frame's priorities would be mapped to the default best-effort priority);
 mapping from an incoming frame's priority to outgoing priority;
 scheduling profile, such as weighted round-robin or strict-priority based queuing;
 mapping of an incoming frame's priority to strict-priority based or weighted round-robin traffic classes;
 flow control mechanisms on a strict-priority based or weight round-robin traffic class; and
 limitations on multicast datarate.

An FCoE configuration profile within a port profile defines the attributes needed for the port to support FCoE, which can include:
 FCoE VLAN;
 FCMAP;
 FCoE Priority; and
 virtual Fabric ID.

A security configuration profile within a port profile defines the security rules needed for the server port. However, the security rules can be different at different ports, so some of the locally configured ACLs can be allowed to override conflicting rules from a port profile. A typical security profile can contain the following attributes:
 Enable 802.1x with EAP TLV extensions for VM mobility; and
 MAC based standard and extended ACLs.

Figure 7B:
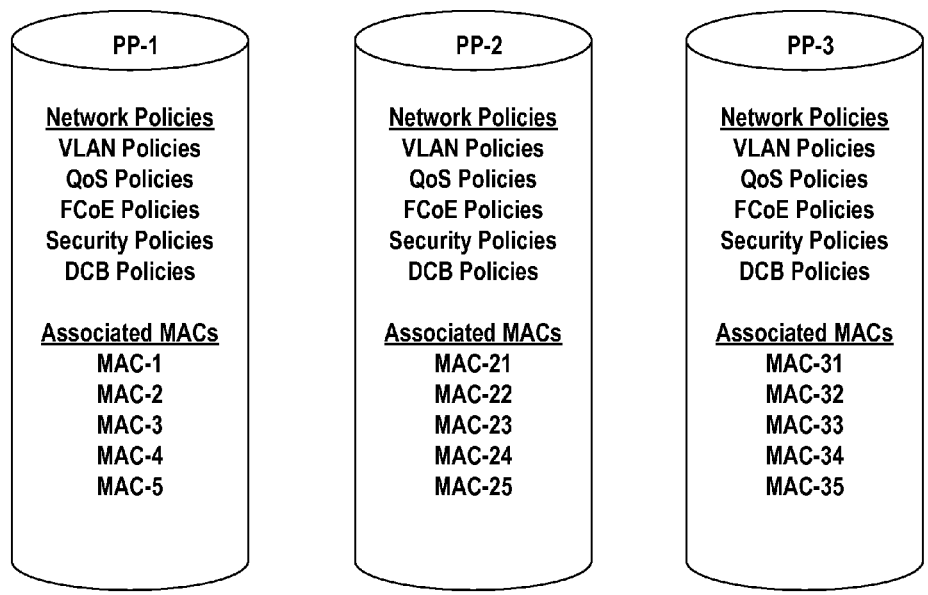
FIG. 7B illustrates three exemplary port profiles, in accordance with on embodiment of the present invention.

In one embodiment, each port profile can have one or more MAC addresses associated with it. FIG. 7B illustrates three exemplary port profiles, in accordance with one embodiment of the present invention. In this example, port profile PP-1 is associated with 5 MAC addresses. These MAC addresses can be virtual MAC addresses assigned to different VMs. The port-profile-to-MAC mapping information is distributed throughout the VCS. A port profile can be activated on a server port in three ways: (1) when a hypervisor binds a MAC address to a port profile ID; (2) through regular MAC learning; and (3) through a manual configuration process via a management interface.

Figures 8A, 8B:
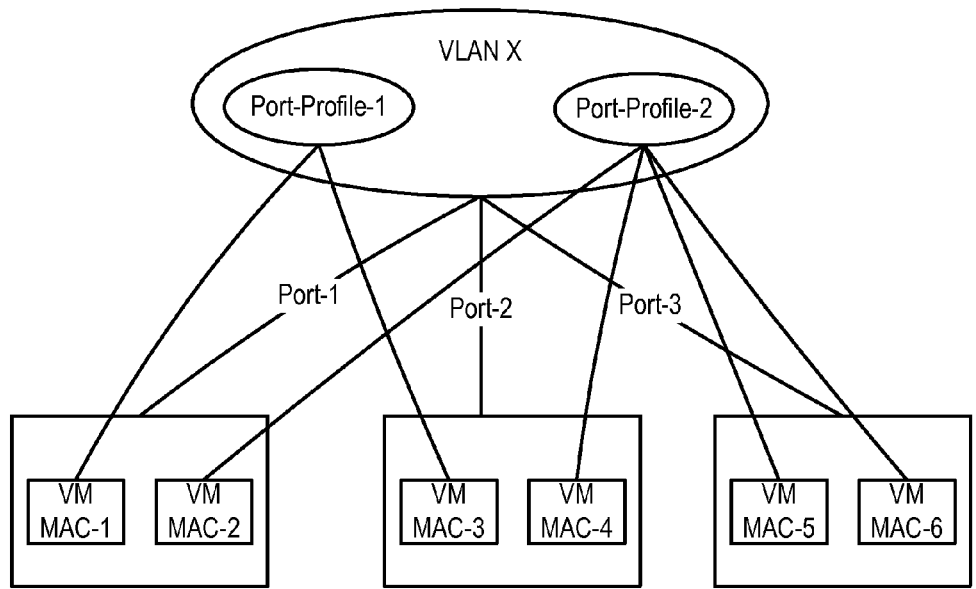
FIG. 8A illustrates exemplary port profile memberships for VMs, in accordance with one embodiment of the present invention.
FIG. 8B illustrates how forwarding is achieved between VMs based on port profile membership, in accordance with one embodiment of the present invention.

It is possible to group a set of VMs in the network by associating them with one port profile. This group can be used to dictate forwarding between the VMs. FIG. 8A illustrates exemplary port profile memberships for VMs, in accordance with one embodiment of the present invention. In this example, port profile 1 has two members: MAC-1 and MAC-3. Port profile 2 has four members: MAC-2, MAC-4, MAC-5, and MAC-6. All the VMs belong to the same VLAN X. FIG. 8B illustrates how forwarding is achieved between VMs based on port profile membership, in accordance with one embodiment of the present invention. Based on the tuple <MAC, VLAN ID>, a policy group ID (GID) can be determined. All the MAC addresses mapped to the same port profile should belong to the same policy group which dictates the forwarding boundary. This configuration allows enforcing different forwarding domains within a VLAN, as illustrated in FIG. 8B. The system then ensures that both the source MAC address and destination MAC address are part of the same port profile.

Figure 9:
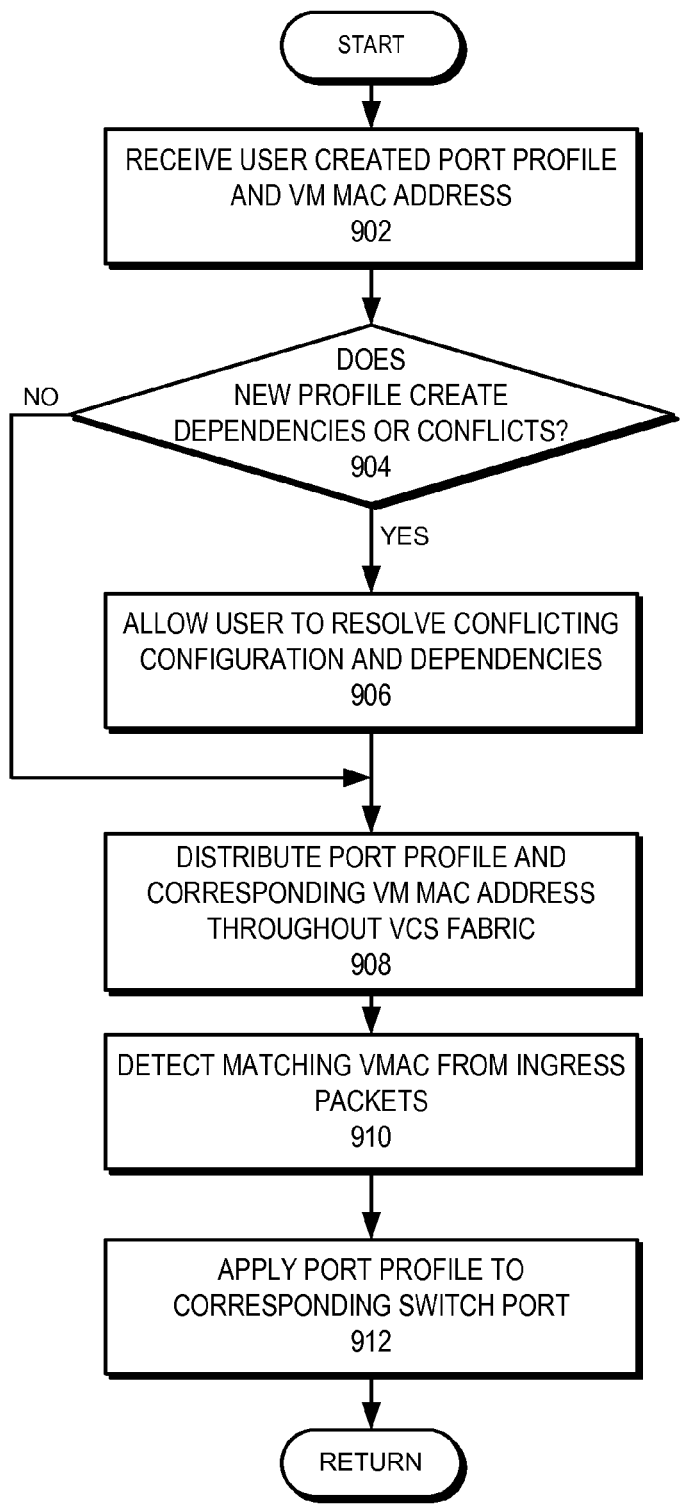
FIG. 9 presents a flowchart illustrating the process of creating and applying a port profile, in accordance with one embodiment of the present invention.

FIG. 9 presents a flowchart illustrating the process of creating and applying a port profile, in accordance with one embodiment of the present invention. During operation, the system receives a user created port profile with the corresponding VM's MAC address (operation 902). This MAC address is then associated with the port profile and can be later used to identify the profile. The system then determines whether the new profile creates dependencies on other existing profiles or conflicts (operation 904). If so, the system allows the user to resolve the conflicting configuration and/or dependencies (operation 906).

Subsequently, the system distributes the port profile and the corresponding VM MAC address to every member switch throughout the VCS fabric (operation 908). When a VM is initiated or migrated, the system then detects a matching virtual MAC address from the received ingress packets (operation 910). Based on the learned MAC address, the system then activates the corresponding port profile on the switch port (operation 912).

Port Profile Analytics

AMPP allows a port to accommodate traffic from multiple VMs, particularly when a VM migrates from one physical server to another, without individually configuring the VLAN, ACL, DCB, etc. for the port. AMPP requires the port to be in a "profile mode" which indicates that the port is not individually configured, but operates based on the profile activated at the port. However, port profile may not be set up or configured on a target switch of a migrating VM, or can be set up with network settings that mismatch with the port profile at the source switch of the VM. For example, the VLAN membership for the VM can be defined in both port profiles. If the profiles do not match, there can be a traffic disruption after the migration. Hence, it is essential to have port profile analytics to ensure a seamless VM migration.

When a VM migration is initiated, the port profiles on the target switch are examined with the MAC address of the VM. In some embodiments, the source and target switches are member switches of a fabric switch (e.g., a VCS), and a data structure contains all the port profiles of the fabric switch. When a target switch is analyzed, the switch sends a list containing the profiles set up at the switch. The corresponding port profiles are retrieved from the data structure and examined. In some embodiments, the data structure is stored in each member switch in a VCS. In some other embodiments, the data structure is stored in a centralized location.

Figure 10A:
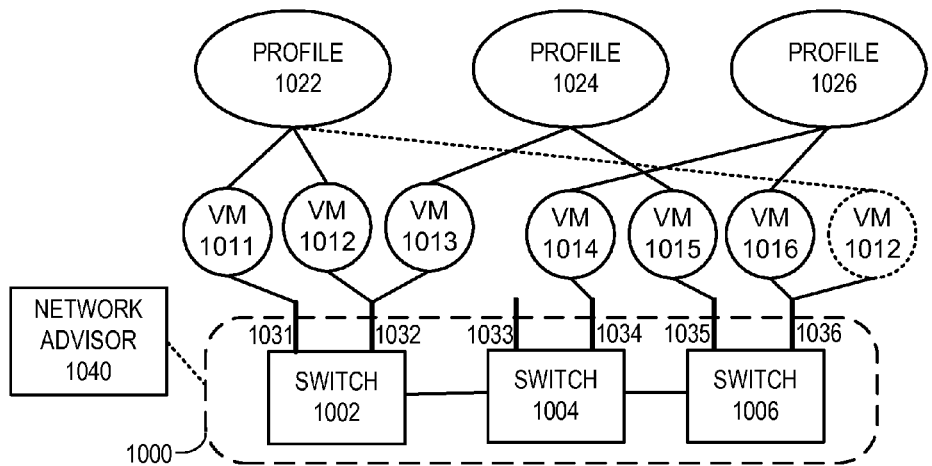
FIG. 10A illustrates how VCS member switches couple virtual machines associated with different port profiles, in accordance with one embodiment of the present invention.

FIG. 10A illustrates how VCS member switches couple end devices associated with different port profiles, in accordance with one embodiment of the present invention. VCS 1000 includes member switches 1002, 1004, and 1006. VMs 1011 and 1012 are associated with port profile 1022, VMs 1013 and 1015 are associated with port profile 1024, and VMs 1014 and 1016 are associated with port profile 1026. VMs 1011-1016 are coupled to switches 1002, 1004, and 1006 via physical ports 1031-1036. Port 1033 on switch 1004 does not have any VM coupled to it.

During operation, when a VM sends a packet to the port it is coupled to, the port profile associated with the VM is activated at the port. In this example, in port 1032, port profile 1022 is activated when VM 1012 sends a packet, and port profile 1024 is activated when VM 1013 sends a packet. When VM 1012 migrates from source switch 1002 to target switch 1006 (denoted with dotted lines), port profile 1022 should be activated on port 1036. However, before the migration, VMs coupled to switch 1015 are associated only with port profiles 1024 and 1026. As a result, port profile 1022 may not be set up in switch 1006. Under this scenario, there is no port profile in switch 1006 that includes the MAC address of VM 1012; consequently, when VM 1012 migrates to switch 1006, no corresponding port profile can be activated.

In another scenario, port profile 1022 can be set up in switch 1006 and, consequently, is activated when VM 1012 migrates to target switch 1006. However, due to an error (e.g., a human error of the network administrator), port profile 1022 can be set up with different network settings in source switch 1002 and target switch 1006. For example, the VLAN settings in port profile 1022 can be different in switches 1002 and 1006. As a result, after the migration, traffic to and from VM 1012 can be disrupted. In another scenario, target switch 1006 or target port 1036 can be overutilized. Hence, after the migration, communications to and from VM 1012 are hampered. To avoid such issues, in some embodiments, VCS 1000 is coupled to a network advisor 1040, which checks whether a port profile is correctly configured in a target switch. In some further embodiments, network advisor 1040 diagnoses any network disruption due to a mismatch in port profiles after a VM migration.

Figure 10B:
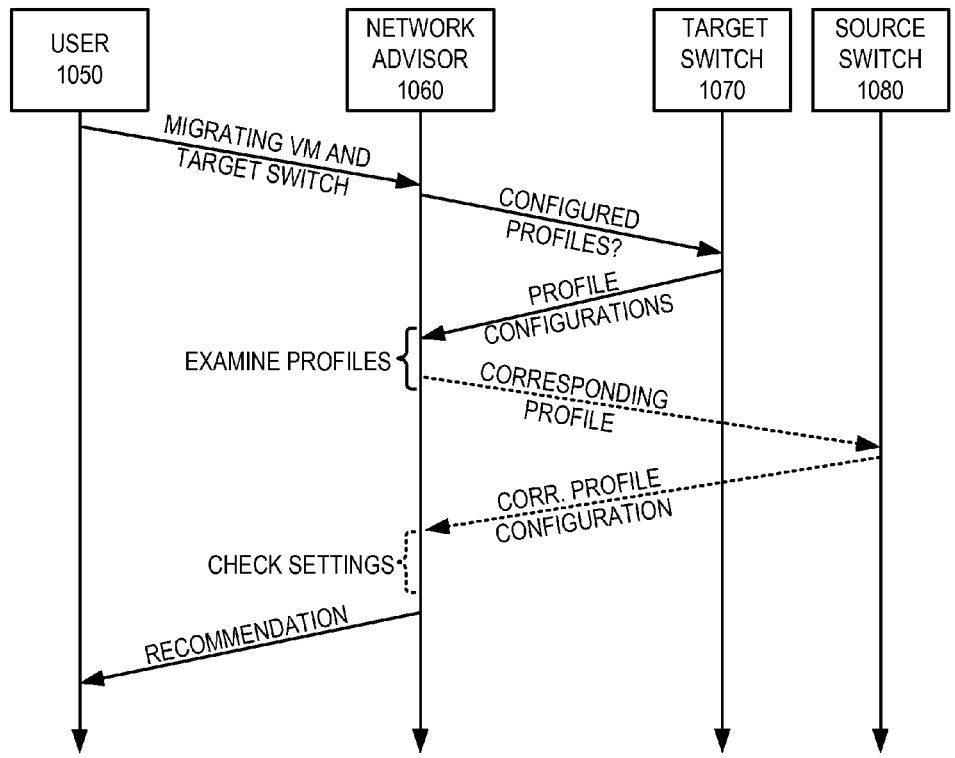
FIG. 10B presents an exemplary communication required for recommending a target switch for a migrating virtual machine, in accordance with one embodiment of the present invention.

FIG. 10B presents an exemplary communication required for recommending a target switch for a migrating virtual machine, in accordance with one embodiment of the present invention. During operation, a user 1050 informs network advisor 1060 of a migrating VM and a target switch 1070 for the VM. In some embodiments, network advisor 1060 is implemented as a network management application. In some further embodiment, network advisor 1060 resides on target switch 1070. In some embodiments, network advisor 1060 can be reached using a command line interface (CLI).

Upon receiving the target switch information from the user 1050, network advisor 1060 queries for port profiles set up and configured on target switch 1070. Target switch 1070 provides network advisor 1060 with configurations of all locally set up port profiles. Network advisor 1060 examines the port profiles and checks whether the MAC address of the migrating VM is configured in these profiles. If the MAC address is identified in a port profile, network advisor 1060 obtains the port profile associated with the VM from source switch 1080 and checks whether there is any mismatch in the network settings in port profiles associated with the migrating VM (denoted in dotted lines). Network advisor 1060 can also check whether target switch 1070 and the target port are overutilized. Based on these port profile analytics, network advisor 1060 then recommends to user 1050 whether the target switch is suitable for the migrating VM.

Figure 11:
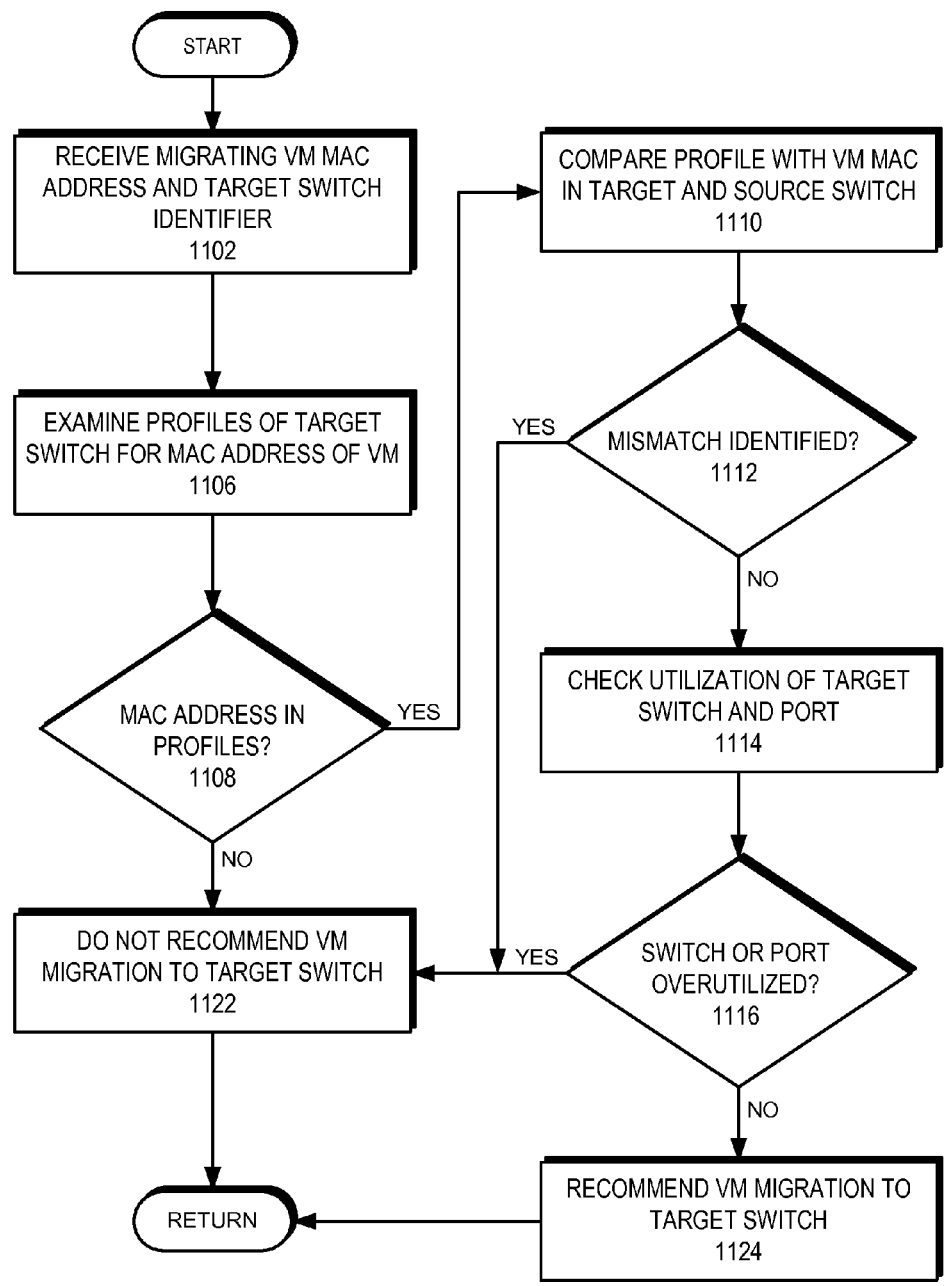
FIG. 11 presents a flowchart illustrating the process of recommending a target switch for a migrating virtual machine, in accordance with one embodiment of the present invention.

FIG. 11 presents a flowchart illustrating the process of recommending a target switch for a migrating virtual machine, in accordance with one embodiment of the present invention. In some embodiments, the process in FIG. 11 is implemented via a network management application. In some further embodiments, the network management application is integrated with a member switch of a VCS. The application first receives the MAC address of a migrating VM and an identifier to a target switch from a user (operation 1102). In some embodiments, the identifier to the target switch is an RBridge identifier. The application then examines port profiles set up in the target switch for the MAC address of the VM (operation 1106) and checks whether the MAC address is configured in a port profile in the target switch (operation 1108). If the MAC address is not in a port profile set up in the target switch, then the application does not recommend the VM migration to the target switch (operation 1122). Otherwise, the application has identified a port profile with the MAC address of the migrating VM, and consequently, compares the network settings in the port profile with the network settings in the corresponding port profile in the source switch (operation 1110).

The application then checks whether there is any mismatch in the port profiles (operation 1112). If a mismatch is identified, then the application does not recommend the VM migration to the target switch (operation 1122). Otherwise, the application checks utilization of the target switch and the target port (operation 1114). If either of them is overutilized (operation 1116), then the application does not recommend the VM migration to the target switch (operation 1122). If the target switch and the port are not overutilized, then the application recommends VM migration to the target switch (operation 1124). In other words, a VM migration to a target switch is recommended only when the target switch has a port profile that has the MAC address of the VM (operation 1108), no mismatch is found in network settings of the corresponding port profiles in the target switch and the source switch (operation 1112), and the target switch and port are not overutilized (operation 1116).

Exemplary System

Figure 12:
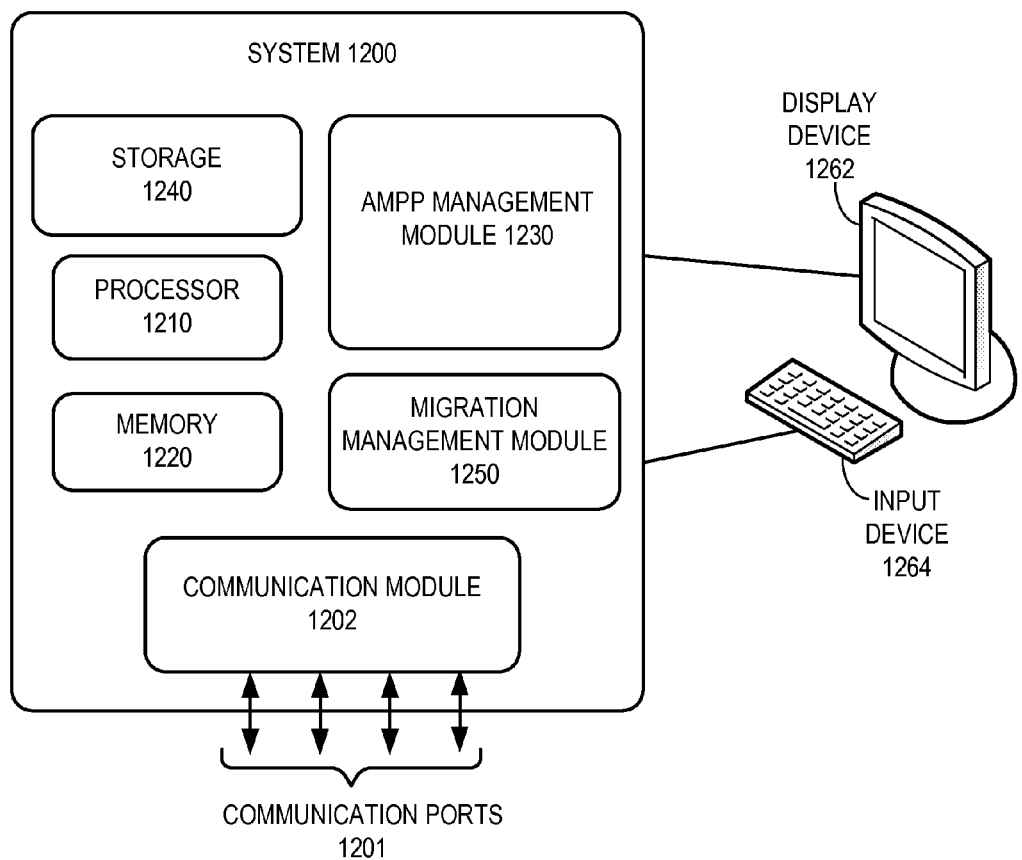
FIG. 12 illustrates an exemplary system which provides port profile analytics, in accordance with one embodiment of the present invention.

FIG. 12 illustrates an exemplary system which provides port profile analytics, in accordance with one embodiment of the present invention. In this example, system 1200 includes a number of communication ports 1201, which can transmit and receive data frames. Also included in system 1200 are a communication module 1202, a processor 1210, a memory 1220, an AMPP management module 1230, a migration management module 1250, and a storage 1240. In some embodiments, a display device 1262 and an input device 1264 are coupled to system 1200.

During operation, processor 1210 extracts information from incoming frames received by communication module 1202 based on the instructions on memory 1220. From the extracted information, AMPP management module 1230 identifies a port profile associated with a migrating VM. This dynamic port profile identification can respond to VM migration within a very short period of time. Migration management module 1232, in conjunction with AMPP management module 1230, then examined port profiles of a target switch for the VM migration and identifies whether the target switch is recommendable for a migrating VM using display device 1262. The information can be requested via input device 1264 or communication ports 1201.

In summary, embodiments of the present invention provide a method and a computer system for recommending a target switch for a migrating virtual machine. In one embodiment, the computer system includes a display mechanism, a storage, and a migration management mechanism. The storage stores a data structure indicating one or more port profiles. The migration management mechanism identifies one or more port profiles associated with a target switch for a migrating virtual machine, wherein the target switch is coupled to a target host machine of the virtual machine and recommends whether the target switch is suitable for the virtual machine by examining an identifier to the virtual machine in the port profiles associated with the target switch using the display mechanism.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer system, comprising:
a storage storing a data structure comprising one or more port profiles; and
a migration management module operable to:
identify one or more port profiles associated with a target switch for a migrating virtual machine, wherein the target switch is coupled to a target host machine of the migrating virtual machine; and
identify the target switch as not recommendable in response to identifying a mismatch between a port profile associated with the target switch and a port profile associated with a source switch of the virtual machine.

2. The computer system of claim 1, wherein the migration management module is further operable to identify the target switch as not recommendable in response to not finding an identifier of the virtual machine in the port profiles associated with the target switch.

3. The computer system of claim 1, wherein the migration management module is further operable to identify the mismatch after the migration virtual machine to the target switch.

4. The computer system of claim 1, wherein the migration management module is further operable to identify the target switch as not recommendable in response to identifying the target switch as overutilized.

5. The computer system of claim 1, wherein the port profiles include one or more sets of the following configuration information:
Fibre Channel over Ethernet (FCoE) configuration;
VLAN configuration;
data center bridging (DCB) configuration;
quality of service (QoS) configuration; and
security-related configuration.

6. The computer system of claim 1, wherein the target switch maintains a membership in a fabric switch, and wherein the fabric switch is operable to accommodate a plurality of switches and operates as a single switch.

7. A computer-executable method, comprising:
storing in a data structure one or more port profiles; and
identifying one or more port profiles associated with a target switch for a migrating virtual machine, wherein the target switch is coupled to a target host machine of the migrating virtual machine; and
identifying the target switch as not recommendable in response to identifying a mismatch between a port profile associated with the target switch and a port profile associated with a source switch of the virtual machine.

8. The method of claim 7, further comprising identifying the target switch as not recommendable in response to not finding an identifier of the virtual machine in the port profiles associated with the target switch.

9. The method of claim 7, further comprising identifying the mismatch after the virtual machine migration to the target switch.

10. The method of claim 7, further comprising identifying the target switch as not recommendable in response to identifying the target switch as overutilized.

11. The method claim 7, wherein the port profiles include one or more sets of the following configuration information:
Fibre Channel over Ethernet (FCoE) configuration;
VLAN configuration;
data center bridging (DCB) configuration;
quality of service (QoS) configuration; and
security-related configuration.

12. The method of claim 7, wherein the target switch maintains a membership in a fabric switch, and wherein the fabric switch is adapted to accommodate a plurality of switches and operates as a single switch.

13. A system, comprising:
a network manager;
wherein the network manager comprises:
a storage storing a data structure indicating one or more port profiles; and
a migration management module operable to:
identify one or more port profiles associated with a target switch for a migrating virtual machine, wherein the target switch is coupled to a target host machine of the migrating virtual machine; and
identify the target switch as not recommendable in response to identifying a mismatch between a port profile associated with the target switch and a port profile associated with a source switch of the virtual machine.

14. The system of claim 13, wherein the migration management module in the network manager is further operable to identify the target switch as not recommendable in response to not finding an identifier of the virtual machine in the port profiles associated with the target switch.

15. The system of claim 13, wherein the migration management module in the network manager is further operable to identify the mismatch after the virtual machine migration to the target switch.

16. The system of claim 13, wherein the migration management module in the network manager is further operable to identify the target switch as not recommendable in response to identifying the target switch as overutilized.

17. The system of claim 13, wherein the port profiles include one or more sets of the following configuration information:
Fibre Channel over Ethernet (FCoE) configuration;
VLAN configuration;
data center bridging (DCB) configuration;
quality of service (QoS) configuration; and
security-related configuration.

18. The system of claim 13, wherein the target switch maintains a membership in a fabric switch, and wherein the fabric switch is operable to accommodate a plurality of switches and operates as a single switch.

* * * * *